(12) United States Patent
Chen et al.

(10) Patent No.: US 8,108,360 B2
(45) Date of Patent: Jan. 31, 2012

(54) DATABASE OBJECT UPDATE ORDER DETERMINATION

(75) Inventors: John Z. Chen, Woodinville, WA (US); Kawarjit S. Bedi, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 483 days.

(21) Appl. No.: 12/104,959

(22) Filed: Apr. 17, 2008

(65) Prior Publication Data

US 2009/0265301 A1 Oct. 22, 2009

(51) Int. Cl.
*G06F 7/00* (2006.01)
*G06F 17/00* (2006.01)

(52) U.S. Cl. .......... 707/687; 707/694; 707/695

(58) Field of Classification Search ........ 707/694, 707/687, 695
See application file for complete search history.

(56) References Cited

U.S. PATENT DOCUMENTS

| 5,321,832 | A | | 6/1994 | Tanaka et al. | |
|---|---|---|---|---|---|
| 5,375,239 | A | * | 12/1994 | Mortson | 717/140 |
| 5,553,218 | A | * | 9/1996 | Li et al. | 1/1 |
| 5,613,106 | A | * | 3/1997 | Thurman et al. | 707/648 |
| 5,974,407 | A | | 10/1999 | Sacks | |
| 6,456,995 | B1 | * | 9/2002 | Salo et al. | 707/703 |
| 6,460,052 | B1 | * | 10/2002 | Thomas et al. | 707/695 |
| 6,484,181 | B2 | | 11/2002 | Attaluri et al. | |
| 6,542,883 | B1 | * | 4/2003 | Salo | 1/1 |
| 6,557,012 | B1 | * | 4/2003 | Arun et al. | 1/1 |
| 6,697,851 | B1 | * | 2/2004 | Althaus et al. | 709/220 |
| 6,711,582 | B2 | | 3/2004 | Aldridge et al. | |
| 7,031,956 | B1 | * | 4/2006 | Lee et al. | 1/1 |
| 7,240,054 | B2 | | 7/2007 | Adiba et al. | |
| 2008/0046440 | A1 | | 2/2008 | Estes | |

OTHER PUBLICATIONS

IBM Informix Guide to SQL: Syntax. Version 10.0/8.5. © 2005.*
Visual Studio Magazine Online (5 pages) http://visualstudiomagazine.com/columns/article.asp?editorialsid=2129, 2008.
IBM Informix Dynamic Server Enterprise Replication Guide (4 pages) http://publib.boulder.ibm.com/infocenter/idshelp/v10/index.jsp?topic=/com.ibm.erep.doc/erep65.htm, 2005.
Extending the PFC Multi Table Update Service (6 pages) http://www.pfcguide.com/pfcmag/multitab_page02.asp, 2004.

* cited by examiner

*Primary Examiner* — Charles Lu
(74) *Attorney, Agent, or Firm* — Workman Nydegger

(57) ABSTRACT

In one embodiment, a computer system receives an indication that a portion of data at a first node in a first database table is to be modified according to a received update command. The computer system assigns the first database table a base height value indicating that the first database table is the base node in a search for related nodes, accesses one or more other database tables in the database, and identifies at least one other accessed database table that has a node with data related to the modified data of the first node. The computer system assigns the other accessed database table a height value different than that assigned to the base node, orders the first database table and any other identified database tables by assigned height value, and updates the data at each node based on the established height value ordering and the type of update command received.

12 Claims, 5 Drawing Sheets

DATABASE OBJECT UPDATE ORDER DETERMINATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a web browsing application running on one computer system may be designed to communicate with a web server running on another computer system. The web server, in turn, may be designed to communicate with a database server configured to store and retrieve information. The information from the database may then be communicated back to the web browser via the web server.

Database servers are typically designed to access data quickly and reliably. Furthermore, database servers are often designed to accommodate multiple simultaneous users. In such cases, multiple users may request access to the same data file at the same time. Those users may make changes to files that are being accessed concurrently by others. Those changes may include creation, replacement, updating, deleting (CRUD) or other changes. In such cases, the order in which data file updates are applied becomes increasingly important.

BRIEF SUMMARY

Embodiments described herein are directed to determining a proper processing sequence for a data modification that affects data in the plurality of interconnected database tables. In one embodiment, a computer system receives an indication that at least a portion of data at a first node in a first database table is to be modified according to a received update command. The computer system assigns the first database table a base height value indicating that the first database table is the base node in a search for related nodes, accesses one or more other database tables in the database, and identifies at least one other accessed database table that has a node with data related to the modified data of the first node. The computer system assigns the other accessed database table a height value different than that assigned to the base node, orders the first database table and any other identified database tables by assigned height value, and updates the data at each node based on the established height value ordering and the type of update command received.

In an alternative embodiment, a computer system determines a proper processing sequence for a data modification that affects data in the plurality of interconnected database rows. The computer system receives an indication that at least a portion of data at a first node in a first database row is to be modified according to a received update command. The computer system assigns the first database row a base height value indicating that the first database row is the base row in a search for related rows, accesses one or more other database rows in the database table, and identifies at least one other accessed database row that has a node with data related to the modified data of the first node. The computer system assigns the other accessed database row a height value different than that assigned to the base row, orders the first database row and any other identified database row by assigned height value, and updates the data at each node based on the established height value ordering and the type of update command received.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
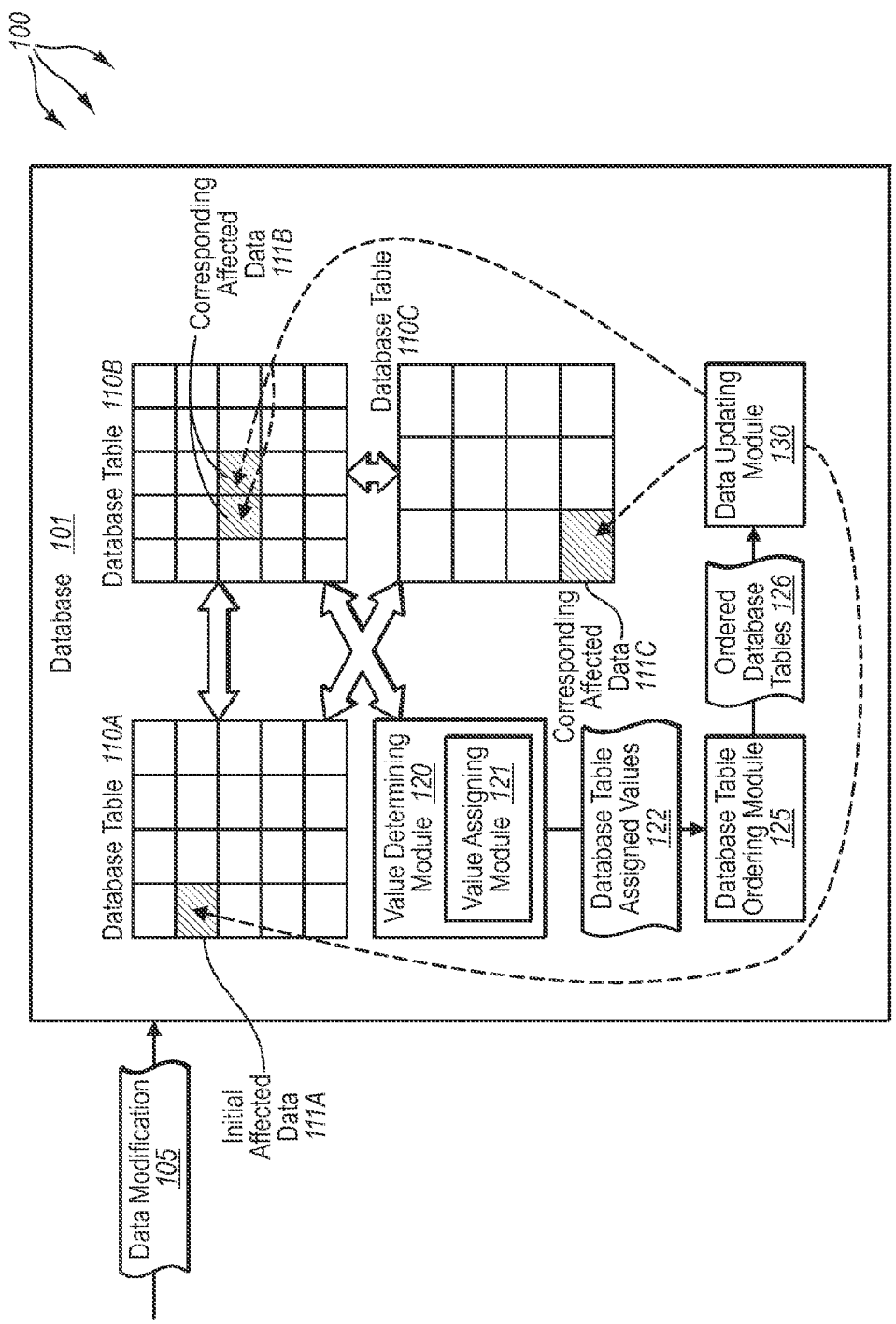
FIG. 1 illustrates a computer architecture in which embodiments of the present invention may operate including determining a proper processing sequence for a data modification that affects data in the plurality of interconnected database tables.

Embodiments described herein are directed to determining a proper processing sequence for a data modification that affects data in the plurality of interconnected database tables. In one embodiment, a computer system receives an indication that at least a portion of data at a first node in a first database table is to be modified according to a received update command. The computer system assigns the first database table a base height value indicating that the first database table is the base node in a search for related nodes, accesses one or more other database tables in the database, and identifies at least one other accessed database table that has a node with data related to the modified data of the first node. The computer system assigns the other accessed database table a height value different than that assigned to the base node, orders the first database table and any other identified database tables by assigned height value, and updates the data at each node based on the established height value ordering and the type of update command received.

In an alternative embodiment, a computer system determines a proper processing sequence for a data modification that affects data in the plurality of interconnected database rows. The computer system receives an indication that at least a portion of data at a first node in a first database row is to be modified according to a received update command. The computer system assigns the first database row a base height value indicating that the first database row is the base row in a search for related rows, accesses one or more other database rows in the database table, and identifies at least one other accessed database row that has a node with data related to the modified data of the first node. The computer system assigns the other accessed database row a height value different than that assigned to the base row, orders the first database row and any other identified database row by assigned height value, and updates the data at each node based on the established height value ordering and the type of update command received.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes database 101. In some embodiments, computer system 101 may be configured to receive data modifications 105 from computer users and/or other computer systems. Data modifications 105 may include creation, replacement, updating, deletion (commonly referred to as CRUD operations) or other types of data modifications. In some cases, data modifications 105 may affect data in one or more database tables within database 101.

For example, modification 105 may affect data in database table 110A (e.g. affected data 111A), data 111B in database table 110B, and/or data 111C in database table 110C. Each database table may be of a different or the same size and may include more or less rows and columns than are shown in FIG. 1. Similarly, although affected data 111A and corresponding affected data 111B & 111C are shown as one or two portions of data, each may encompass entire rows or even entire tables of information. The relationships between affected data may be one-to-one, one-to-many, or many-to-one. Thus, in one embodiment, data modification 105 may directly affect data 111A in database table 110A, which may affect corresponding affected data 111B in table 110B, which may affect corresponding affected data 111C in table 110C. Other modules in database 101 may be used to determine an appropriate order for processing data modification 105 in the various affected tables.

Value determining module 120 may be configured to assign a value such as a height value to each of the database tables identified as having data affected by modification 105 (e.g. database tables 110A, 110B and 110C). In some embodiments, database 101 may determine dependencies between various portions of data. Thus, in one embodiment, database 101 may determine that data 111A is directly affected by modification 105. Database 101 may then determine that affected data 111A is dependent on or related to corresponding affected data 111B in database table 110B. Furthermore, database 101 may determine that corresponding affected data 111B is dependent on or related to corresponding affected data 111C in database table 110C. Value assigning module 121 may assign a base height value (e.g. zero) to the initial affected database table, 110A. Value assigning module 121 may then assign an increased height value to table 110B (e.g. one), and a further increased height value (e.g. two) to table 110C as a result of the determined dependencies or relationships.

Continuing this example, these database table assigned values 122 (i.e. zero, one and two) may be sent to database table ordering module 125. Ordering module 125 may be configured to order the identified database tables by assigned height value. Thus, in this example, where database table 110A has a height value of zero, database table 110B has a height value of one, and database table 110C has a height value of two, ordering module 125 may order the database tables 110C, 110B, 110A in decreasing height value, or, alternatively, 110A, 110B, 110C in increasing height value. These ordered database table values or sequences 126 may be sent to data updating module 130.

Data updating module 130 may be configured to receive ordered database tables 126 which indicates an ascending or descending order of database tables, indicating the order in which data modification 105 is to be applied to the various database tables. Thus, data updating module 130 may update each of data portions 111A, 111B and 111C in the order indicated by database table ordering module 125. In some cases, it may be appropriate to apply modification 105 to the table with the highest assigned height value first, and to the rest of the affected tables in descending order. For example, create, replace, and update operations may be applied in this top-down order. In other cases, it may be appropriate to apply modification 105 to the table with the lowest assigned height value first, and to the rest of the affected tables in ascending order. This may be particularly appropriate for delete operations, where the initial affected data is deleted before the data of corresponding database tables with data dependent on the affected data. These and other concepts mentioned above will be explained in greater detail below, with regard to method 200 of FIG. 2.

Figure 2:
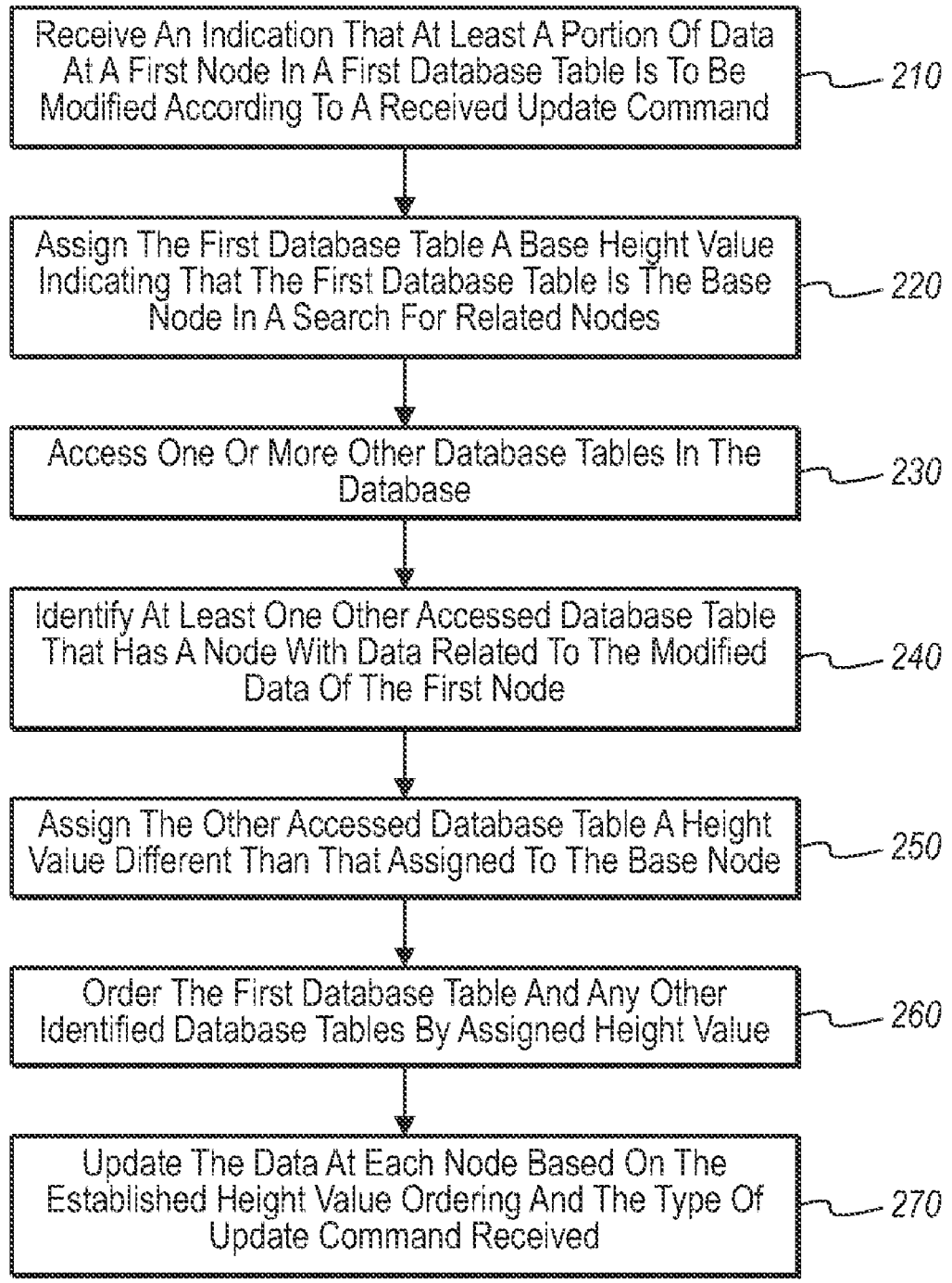
FIG. 2 illustrates a flowchart of an example method for method for determining a proper processing sequence for a data modification that affects data in the plurality of interconnected database tables.
Figure 4:
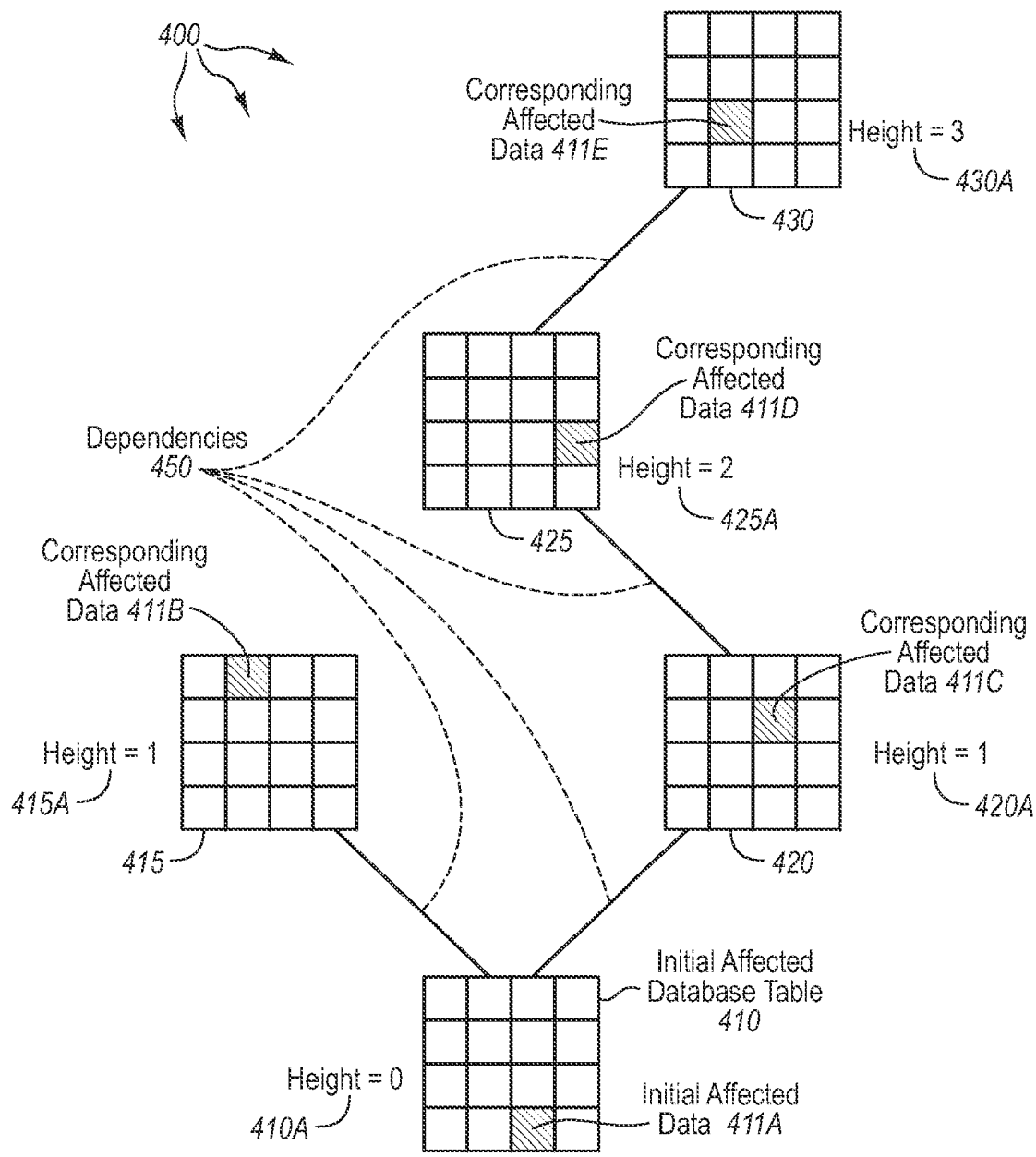
FIG. 4 illustrates a database architecture in which embodiments of the present invention may operate.

FIG. 2 illustrates a flowchart of a method 200 for determining a proper processing sequence for a data modification that affects data in the plurality of interconnected database tables. FIG. 4 illustrates a database architecture including multiple databases with related data. The method 200 will now be described with frequent reference to the components and data of environments 100 of FIG. 1 and 400 of FIG. 4.

Method 200 includes an act of receiving an indication that at least a portion of data at a first node in a first database table is to be modified according to a received update command (act 210). For example, database 101 may receive data modification 105 indicating that at least a portion of data (e.g. affected data 111A) in database table 110A is to be modified according to the modifications described in data modification 105. In some cases, data modification 105 may include a CRUD operation that is to be applied to data 111A. Because, at least in some embodiments, data 111A is related to, and may even be dependent on, data 111B in database table 110B and/or 111C in database table 110C, the modification to data 111A should not be applied without taking into account the data's dependencies.

For example, if data 111B is a parent in relation to data 111A, and if data 111C is a grandparent to data 111A (and a parent to data 111B), the modification should be applied in a proper order, depending on the type of operation that is to be performed. As mentioned above, create, replace, and update operations should be applied in a top-down fashion, beginning with a grandparent (or higher), and working progressively downward until the child is reached. Alternatively, delete operations should be applied in a bottom-up fashion, beginning with the child and working progressively upward until all dependent parents, grandparents (and higher) have been processed.

In some embodiments, data modification 105 may be directed to modifying data of a dataset. For example, each of data 111A, 111B and 111C may belong to a single dataset. Additionally or alternatively, each of database tables 110A, 110B and 110C may belong to a dataset, which may be modified wholly or partially by data modification 105. In some cases, data modification 105 may be directed to modifying data of a typed dataset. A typed dataset, as used herein, may refer to a class that is derived from a dataset. Such a class may inherit methods, events, and properties of a dataset. Moreover, a typed dataset may provide strongly typed methods, events, and properties. In some embodiments, each of data 111A, 111B, and 111C may belong to a typed dataset. In some cases, data 111A, 111B and 111C may belong to the same typed dataset.

Method 200 includes an act of assigning the first database table a base height value indicating that the first database table is the base node in a search for related nodes (act 220). For example, value assigning module 121 may assign database table 110A a height value of zero, indicating that table 110A is the base node in a search for related nodes/tables. In some embodiments, value determining module 120 may be configured to determine which database tables include data values that are related to or correspond to initial affected data 111A. These tables may be assigned values by module 121, indicating each table's height values in relation to the base table, table 110A.

Method 200 includes an act of accessing one or more other database tables in the database (act 230). For example, value determining module 120 may be configured to access database tables 110B, 110C, and any other database tables not shown in FIG. 1 that are a part of database 101, or are a part of other connected databases. Value determining module 120 may be configured to continue accessing database tables in search for related nodes (i.e. database tables containing data portions related to affected data 111A) until all dependent nodes have been located. In such cases, after no other related nodes are found in database 101 (or, in some embodiments, in all searched databases), database table accessing may be ceased. Such an action may ensure that the scope of database tables in which a data operation (e.g. a CRUD operation) is to be carried out is fully known, and that the scope's bounds have been determined.

In some cases, value determining module 120 may detect that a node of a database table refers to the same node in the same table. In such cases, this may lead to a circular table accessing operation. Thus, to avoid a circular processing loop, further table accessing may be ceased.

In one embodiment, a user may access an order form that references data in multiple database tables. For example, the form may have order contents stored in database table 110A, an order number stored in database table 110B, and a customer identification number stored in database table 110C. A user may modify the order contents (e.g. initial affected data 111A), the order number (e.g. corresponding affected data 111B) and/or the customer identification number (e.g. corresponding affected data 111C). Depending on the type of operation, the data modification may be applied in a bottom-up fashion beginning with initial affected data 111A (e.g. for delete operations), or applied in a top-down fashion beginning with corresponding affected data 111C (e.g. for create, replace and update operations). Value determining module 120 may be configured to access databases with related data each time a data modification is made to a database table in database 101.

In some cases, users may be able to link and/or use information stored in various databases and/or database tables using a single software application. For example, using one such software application, a user may add a data source to a form associated with one or more database tables. The form may include data that is dependent on data in other database tables. Database 101 may be configured to automatically update code portions that correspond to various fields in the form. Thus, when dependencies change, or are created by the addition of new items, each database table may remain up-to-date with the most current information.

In some embodiments, users may be able to add hierarchical behaviors to a dataset using an integrated development environment (IDE). For example, a user may access a dataset (i.e. a set of related information) in an IDE and add various hierarchical behaviors such as an update order for any or all of the CRUD operations. For instance, a user may specify that the hierarchical update order for the delete operation is to be bottom-up, starting with the initially affected data (e.g. 111A) and progressively deleting each portion of data related to the initially deleted data.

Method 200 includes an act of identifying at least one other accessed database table that has a node with data related to the modified data of the first node (act 240). For example, value determining module 120 may identify accessed database table 110B that has a node with data related to the modified data of table 110A (e.g. node 111B). As explained above, data 111B may have a parental hierarchical relationship with data 111A of table 110A. Moreover, a plurality of data portions 111B may correspond with a single data portion 111A of table 110A. Data 111B may additionally be dependent on other data, for example, corresponding affected data 111C.

Method 200 includes an act of assigning the other accessed database table a height value different than that assigned to the base node (act 250). For example, value assigning module 121 may assign database table 110B a height value higher than that assigned to the base node. Thus, in some embodiments, database table 110A may have an assigned height value of zero, database table 110B may have an assigned height value of one, and database table 110C may have an assigned height value of two. These assigned height values 122 may be sent to database table ordering module 125 for ordering according to height value.

In some cases, as shown in FIG. 4, initial affected data 411A of initial affected database table 410 may be dependent on two portions of information (e.g. data 411B and 411C) in different database tables (e.g. database tables 415 and 420). These database tables may each be one hierarchical level above database table 410. In such cases, each of tables 415 and 420 may be assigned a similar height value; for example, a height value of one (e.g. 415A and 420A, respectively). Because the data portions are in database tables that are one hierarchical level above initial affected database table 410, the data portions in those database tables may be processed in any order. Database tables with corresponding affected data (e.g. data 411D of table 425 and data 411E of table 430) as indicated by dependencies 450 may be assigned higher height values, and would be thus processed after those database tables with a lower height value.

Thus, in one example where a data modification has been received, initial affected database table 410 with initial affected data 411A may be assigned a height value of 0 (410A). Value determining module 120 may determine that database tables 415 and 420 have corresponding affected data (e.g. 411B and 411C, respectively), and value assigning module 121 may assign each of tables 415 and 420 similar height values (e.g. a value of one, 415A and 420A, respectively). Value determining module 120 may further determine that corresponding affected data 411D is related to data 411C (or, alternatively, that data 411C is dependent on data 411D). Database table 425 may thus be assigned a height value higher than that of table 420, in this case, a height value of two 425A. Lastly, in this example, value determining module 120 may further determine that corresponding affected data 411E is related to data 411D (or, alternatively, that data 411D is dependent on data 411E). Database table 430 may thus be assigned a height value higher than that of table 425, in this case, a height value of three 430A. These height values may be used to determine or define a processing order for processing a data modification (e.g. 105). In this manner, a hierarchical tree of related database tables may be built.

Method 200 includes an act of ordering the first database table and any other identified database tables by assigned height value (act 260). For example, database table ordering module may sort and/or order database tables 110A, 110B and 110C (or tables 410, 415, 420, 425 and 430) by assigned height value. The tables may be ordered from highest to lowest, lowest to highest, or in some other customizable, user-specified order. Database table ordering module may be configured to send ordered database tables 126 to data updating module 130 for update processing.

Method 200 includes an act of updating the data at each node based on the established height value ordering and the type of update command received (act 270). For example, data updating module 130 may update each of data 111A, 111B, and 111C at their corresponding database tables based on the established height value ordering and the type of update operation indicated in modification 105. For example, when the type of update command is a delete command, the data at each related node may be deleted, starting at the node with the lowest height value, progressively up to the node with the highest height value. Thus, in one example as shown in FIG. 1, where database table 110A has the lowest assigned height value, data 111A may be deleted first, then corresponding affected data 111B of database table 110B, and finally corresponding affected data 111C of database table 110C.

In other cases, when the type of update command comprises a modify command, the data at each related node may be modified, starting at the node with the highest height value, progressively down to the node with the lowest height value. Thus, as shown in FIG. 1, where database table 110C has the highest assigned height value, data 111C may be modified (e.g. created, replaced or updated) first, then corresponding affected data 111B of database table 110B, and finally initial affected data 111A of database table 110A. In some embodiments, this may allow a user to initial CRUD operations in any order, on any database object, and the actual implementation of each CRUD operation will be handled according to assigned height value and determined update order. In some cases, all changes for any one database may be applied or committed in the same data transaction. Additionally or alternatively, where the database tables are members of the same typed dataset, all changes for the dataset may be applied in the same transaction.

Figure 3:
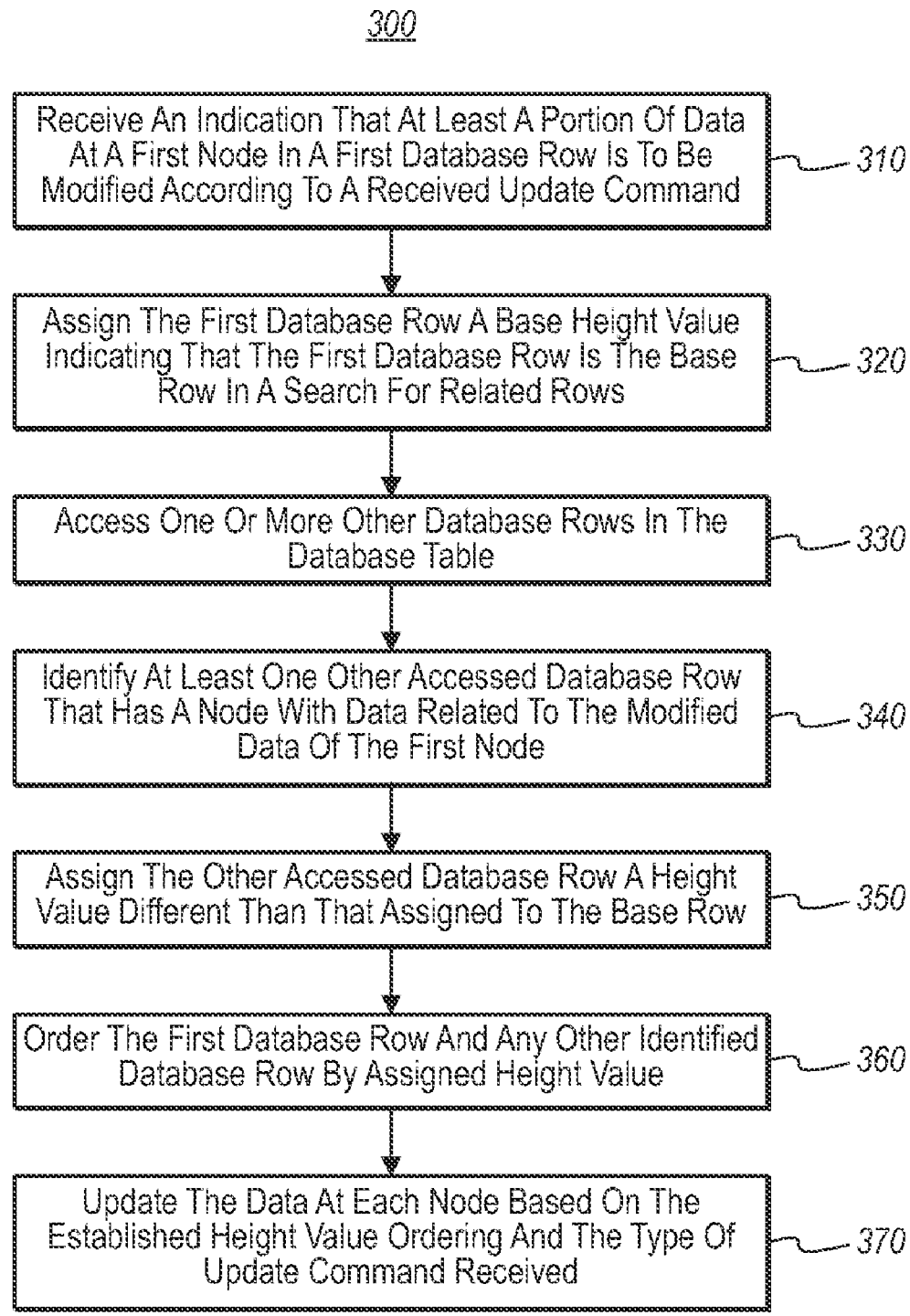
FIG. 3 illustrates a flowchart of an example method for determining a proper processing sequence for a data modification that affects data in the plurality of interconnected database rows.
Figure 5:
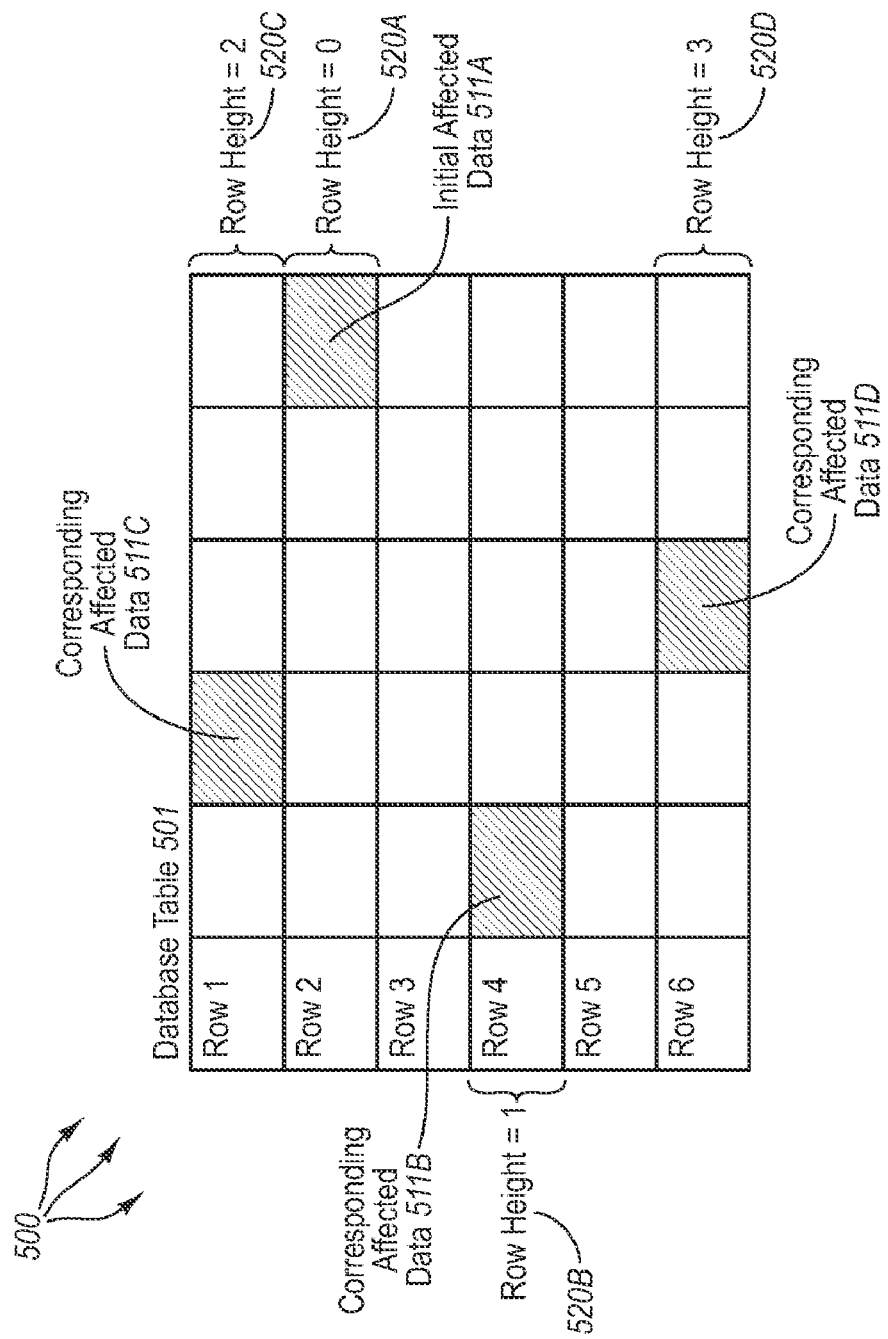
FIG. 5 illustrates a database table architecture in which embodiments of the present invention may operate.

FIG. 3 illustrates a flowchart of a method 300 for determining a proper processing sequence for a data modification that affects data in the plurality of interconnected database rows. FIG. 5 illustrates a database table architecture including multiple database rows with related data. The method 300 will now be described with frequent reference to the components and data of environments 100 of FIG. 1 and 500 of FIG. 5.

Method 300 includes an act of receiving an indication that at least a portion of data at a first node in a first database row is to be modified according to a received update command (act 310). For example, database 101 may receive data modification 105 indicating that initial affected data 511A in database Row 2 is to be modified according to an update command included in modification 105. For example, modification 105 may indicate that a data file stored in Row 2 of database table 501 is to be modified (e.g. created, replaced, updated or deleted). Before applying the modification, it may be advantageous to determine whether data 511A is related to or is dependent on other information in other database tables or within database table 501.

Method 300 includes an act of assigning the first database row a base height value indicating that the first database row is the base row in a search for related rows (act 320). For example, value assigning module 121 may assign Row 2 a base height value of zero (520A) indicating that Row 2 is the base row in a search for related database rows. In some embodiments, the base row may be the trunk of a hierarchical dependency tree that outlines the relationships between data of various rows within the database table.

Method 300 includes an act of accessing one or more other database rows in the database table (act 330). For example, value determining module 120 may access Rows 1 and 3-6 in database table 501 to determine whether any dependencies exist between initial affected data 511A and other data in other rows. In some cases, the data in each row has one of two different states: current and original. In such cases, accessing the database rows in database table 501 may include separate row accessing attempts for both the current and original states, for each portion of data. This may be done to ensure that, regardless of whether the data is in an original or a modified (current) state, all dependencies in relation to initial affected data 511A may be determined. Furthermore, value determining module 120 may be configured to continue accessing database rows until no additional data dependencies are detected. In cases where a row refers back to itself, database row access may be terminated, so as to avoid an infinite processing loop.

Method 300 includes an act of identifying at least one other accessed database row that has a node with data related to the modified data of the first node (act 340). For example, value determining module 120 may identify corresponding affected data 511B on Row 4. As indicated above in relation to corresponding data portions on different database tables, corresponding data portions in different database rows may correspond in one-to-one, one-to-many, or many-to-one fashions.

Method 300 includes an act of assigning the other accessed database row a height value different than that assigned to the base row (act 350). For example, value assigning module 121 may assign Row 4 a height value of one (520B), indicating a height value higher than that assigned to the base row, Row 2. Other rows with corresponding affected data (e.g. data 511C of Row 1 and data 511D of Row 6) may be similarly assigned height values according to hierarchical dependencies. Thus, in this example, because data 511B is dependent on data 511C, Row 1 is given a height value higher than that given to Row 4. Similarly, because data 511C is dependent on data 511D, Row 6 is given a height value higher than that given to Row 1. Thus, the height value for Row 1 is 2 (520C) and the height value for Row 6 is 3 (520D). These height values may be used to determine or define processing order for the received data modification 105.

Method 300 includes an act of ordering the first database row and any other identified database row by assigned height value (act 360). For example, database table ordering module 125 may be configured to order Rows 2, 4, 1 and 6 by assigned height value. As above regarding table ordering, rows may be ordered highest value to lowest, lowest to highest, or by any other customizable, user-selected ordering.

Method 300 includes an act of updating the data at each node based on the established height value ordering and the type of update command received (act 370). For example, data updating module 130 may update data 511A, 511B, 511C and 511D at each node according to the established height value ordering and the type of update command received. As with database tables, delete operations among data rows may occur starting with the lowest assigned height value and continuing up to the highest value. Similarly, create, replace and update operations may occur starting with the highest assigned height value and continuing down to the lowest assigned height value. Thus, in a delete operation in FIG. 5, data 511A would be deleted first, then 511B, then 511C, and finally 511D. Moreover, in a create, replace or update operation, data 511D would be modified first, then 511C, then 511B, and finally 511A. In some cases, all of the data modifications made to each row may be processed in a single data transaction.

Thus, the above-described functionality allows a user freedom to interact with the data through a form, through an application, or any other means and perform the operations as they make sense to the user. The database system may then receive those modifications and apply them in a proper order, ensuring that dependencies are maintained and that data is updated properly across databases, database tables, and rows within database tables.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At one or more computer systems in a computer networking environment including a database with a plurality of interconnected database tables, a method, performed by one or more processors of the one or more computer systems, for determining a proper processing sequence for a data modification that affects data in the plurality of interconnected database tables, the method comprising:

an act of receiving an indication that at least a portion of data at a first node in a first database table is to be modified according to a received update command operation, the first database table belonging to a typed dataset;

an act of assigning the first database table a base height value indicating that the first database table is a base node in a search for related nodes;

an act of identifying one or more other database tables within the typed dataset, wherein at least one of the one or more other database tables includes data in rows, the data in each row having one of two states: current and original;

an act of determining that a node in at least one of the one or more other database tables from the typed dataset contains data that is dependent on the at least a portion of data at the first node in the first database table, wherein the act of determining includes:

accessing each of the one or more other database tables within the typed data set including separately accessing the current and original data in the rows of at least one database table;

detecting that a node of a database table refers to a same node in a same table; and ceasing to access the same table, wherein the ceasing avoids a circular processing loop;

an act of assigning each of the at least one other accessed database table a height value different than that assigned to the base node, wherein the height value assigned to each of the at least one other accessed database table is based on the dependency of the data within the respective table on the at least a portion of data at the first node in the first database table;

an act of ordering the first database table and each of the at least one other accessed database table by assigned height value;

an act of applying the same received update command operation to each node to update the data at each node based on the established height value ordering and the type of update command operation received; and an act of committing the applied update command operation to each node as part of a single transaction.

2. The method of claim 1, wherein the act of updating the data at each node based on the established height value ordering and the type of update command operation received comprises, wherein the type of update command operation comprises a delete command, deleting the data at each related node, starting at the node with the lowest height value, progressively up to the node with the highest height value.

3. The method of claim 1, wherein the act of updating the data at each node based on the established height value ordering and the type of update command operation received comprises, wherein the type of update command operation comprises a modify command, modifying the data at each related node, starting at the node with the highest height value, progressively down to the node with the lowest height value.

4. The method of claim 1, further comprising an act of ceasing database table accessing upon determining that there are no other related nodes in the database.

5. The method of claim 1, wherein database users perform CRUD (create, read, update, delete) operations in any order, on any database object.

6. The method of claim 1, wherein a user adds a data source to a form associated with one or more database tables.

7. The method of claim 6, further comprising an act of automatically updating code portions that correspond to one or more fields on the form.

8. The method of claim 1, wherein a user adds hierarchical behaviors to a dataset using an integrated development environment.

9. The method of claim 8, wherein the user selects a hierarchical update order from among the CRUD operations.

10. A computer program product for implementing a method for determining a proper processing sequence for a data modification that affects data in the plurality of interconnected database tables, the computer program product comprising one or more computer readable storage media having stored thereon computer-executable instructions that, when executed by one or more processors of one or more computing systems, cause the one or more computing systems to perform the method, the method comprising:

an act of receiving an indication that at least a portion of data at a first node in a first database table is to be modified according to a received update command operation, the first database table belonging to a typed dataset;

an act of assigning the first database table a base height value indicating that the first database table is a base node in a search for related nodes;

an act of identifying one or more other database tables within the typed dataset, wherein at least one of the one or more other database tables includes data in rows, the data in each row having one of two states: current and original;

an act of determining that a node in at least one of the one or more other database tables from the typed dataset contains data that is dependent on the at least a portion of data at the first node in the first database table, wherein the act of determining includes:

accessing each of the one or more other database tables within the typed data set including separately accessing the current and original data in the rows of at least one database table;

detecting that a node of a database table refers to a same node in a same table; and ceasing to access the same table, wherein the ceasing avoids a circular processing loop;

an act of assigning each of the at least one other accessed database table a height value higher than that assigned to the base node, wherein the height value assigned to each of the at least one other accessed database table is based on the dependency of the data within the respective table on the at least a portion of data at the first node in the first database table;

an act of establishing an end-to-end list of all tables that have nodes with data related to the modified data of the first node prior to updating the data at each node;

an act of ordering the first database table and each of the at least one other accessed database table in the end-to-end list by assigned height value;

an act of applying the same received update command operation to each node to update the data at each node in the list based on the established height value ordering and the type of update command operation received; and an act of committing the applied update command operation to each node as part of a single transaction.

11. The computer program product of claim 10, wherein the act of updating the data at each node in the list based on the established height value ordering and the type of update command operation received comprises, wherein the type of update command operation comprises a delete command, deleting the data at each related node, starting at the node with the lowest height value, progressively up to the node with the highest height value.

12. The computer program product of claim 10, wherein the act of updating the data at each node based on the established height value ordering and the type of update command operation received comprises, wherein the type of update command operation comprises a modification command, modifying the data at each related node, starting at the node with the highest height value, progressively down to the node with the lowest height value.

* * * * *